United States Patent
Hayashi et al.

(10) Patent No.: US 11,490,062 B2
(45) Date of Patent: Nov. 1, 2022

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Masayuki Hayashi, Kawasaki (JP); Kazuki Takemoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/573,410

(22) Filed: Sep. 17, 2019

(65) Prior Publication Data

US 2020/0107004 A1 Apr. 2, 2020

(30) Foreign Application Priority Data

Sep. 27, 2018 (JP) .............................. JP2018-182093

(51) Int. Cl.
*H04N 13/117* (2018.01)
*G06T 7/73* (2017.01)
(Continued)

(52) U.S. Cl.
CPC ............. *H04N 13/117* (2018.05); *G06T 7/75* (2017.01); *G06T 7/90* (2017.01); *G06T 19/006* (2013.01); *H04N 13/122* (2018.05)

(58) Field of Classification Search
CPC ...... H04N 13/117; H04N 13/122; G06T 7/75; G06T 7/90; G06T 19/006; G06T 2207/10028; G06T 2200/04
See application file for complete search history.

(56) References Cited

U.S. PATENT DOCUMENTS 8,081,815 B2 12/2011 Kotake
2012/0314096 A1 12/2012 Kruglick
(Continued)

FOREIGN PATENT DOCUMENTS

JP 2008-65807 A 3/2008
JP 2013109677 A 6/2013
(Continued)

OTHER PUBLICATIONS

Richard A Newcombe, et al, Live Dense Reconstruction with a Single Moving Camera, 2010 IEEE Conference on Computer Vision and Pattern Recognition(CVPR), XP31725624, Jun. 13, 2010, pp. 1498-1505.
(Continued)

*Primary Examiner* — Jennifer Mehmood
*Assistant Examiner* — Andrew Shin
(74) *Attorney, Agent, or Firm* — Canon U.S.A., Inc. IP Division

(57) ABSTRACT

An information processing apparatus includes an acquisition unit configured to acquire an image from an image capturing apparatus that captures an image of a real space, an estimation unit configured to estimate a position or orientation of the image capturing apparatus in the real space, based on the image, a creation unit configured to create a map including at least one keyframe, a setting unit configured to set an observation space of a user, a generation unit configured to analyze a relationship between the observation space set by the setting unit and the map created by the creation unit, and generate a model representing the keyframe included in the map, and a control unit configured to cause a display unit to display a combined image of an image based on the generated model and the image.

22 Claims, 8 Drawing Sheets

(51) Int. Cl.
  *G06T 7/90* (2017.01)
  *H04N 13/122* (2018.01)
  *G06T 19/00* (2011.01)

(56) References Cited

U.S. PATENT DOCUMENTS

| | | |
|---|---|---|
| 2014/0119598 A1 | 5/2014 | Ramachandran |
| 2015/0125045 A1 | 5/2015 | Gauglitz |
| 2017/0061688 A1 | 3/2017 | Miller |
| 2018/0255290 A1 | 9/2018 | Holzer |

FOREIGN PATENT DOCUMENTS

| | | |
|---|---|---|
| JP | 2015001760 A | 1/2015 |
| JP | 2015114905 A | 6/2015 |
| JP | 2018147095 A | 9/2018 |
| WO | 2017/215899 A2 | 12/2017 |

OTHER PUBLICATIONS

Steffen Gauglitz, et al., Model Estimation and Selection towards Unconstrained Real-Time Tracking and Mapping, IEEE Transactions on Visualization and Computer Graphics, vol. 20, No. 6, XP11546407, Jun. 2014, pp. 825-838.
Klein, et al., Parallel Tracking and Mapping for Small AR Workspaces, Proceedings of Sixth IEEE and ACM International, Active Vision Laboratory, Department of Engineering Science, University of Oxford, 2007.
Vuforia Object Scanner, https://library.vuforia.com/articles/Training/Vuforia-Object-Scanner-Users-Guide, (Viewed: Jul. 20, 2019).

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus, an information processing method, and a storage medium storing a computer program to visualize an area for which a map has already been created, in a system for creating a map of a three-dimensional space.

Description of the Related Art

In these days, reductions in the period of and the cost of evaluation using a prototype are required in design and manufacturing fields. A mixed reality (MR) system has been introduced, which evaluates ease of construction and maintainability using design (e.g., shape and specifications) data created by a computer-aided design (CAD) system.

Image display apparatuses of the MR system include video see-through apparatuses and optical see-through apparatuses. A video see-through image forming display apparatus displays a combined image obtained by superimposing and rendering an image of a virtual space (e.g., a virtual object or character information that is rendered using computer graphics) generated based on the position and orientation of an image capturing apparatus on an image of a real space captured by the image capturing apparatus. An optical see-through image display apparatus displays an image in a virtual space generated based on the position-and-orientation of the point of view of an observer, on an optical see-through display mounted on the head of the observer.

One of the most important issues of the MR technology is how to perform accurate positioning between a real space and a virtual space. Various efforts have been made for accurate positioning. The issue in positioning in MR in the video see-through apparatus results in an issue of determining the position-and-orientation of an image capturing apparatus in a scene (i.e., in a reference coordinate system provided in the scene). Similarly, the issue in the optical see-through apparatus results in an issue of determining the point of view of an observer or the position-and-orientation of the display in a scene. One of methods for solving the issue of the video see-through apparatus is a method of constructing a map of a real space and determines the position-and-orientation of a measurement target object based on the map. One of examples of the method is a method called visual simultaneous localization and mapping (SLAM).

Moreover, as a method for solving the problem of the optical see-through apparatus, an image capturing apparatus is mounted on a measurement target object (i.e., the head of an observer or a display). The position-and-orientation of the image capturing apparatus are determined by a method similar to the method for solving the issues in the video see-through apparatus.

Visual SLAM is a method for determining the position-and-orientation of a camera in a real space based on an image captured by the camera, and at the same time, extracts information on a keyframe from the image if required, and constructs a map where the information is stored. Information on the keyframe includes an image, the position-and-orientation of the camera that has captured the image, and three-dimensional information of a feature point extracted from the image. In this technique, the position-and-orientation of the camera can be determined with high accuracy as long as the image has captured the same space as a space captured in the keyframe. On the other hand, if the imaging area of the camera is different from the imaging area of an image of the keyframe stored in a map, and thus the correspondence relation between the images cannot be acquired, the accuracy of the estimation of the position-and-orientation of the camera may be reduced.

Hence, it is desirable that an MR system user who requires highly accurate estimations of the position-and-orientation of the camera is notified of a space that allows a highly accurate estimation of the position-and-orientation of the camera. One of methods for the notification is a method of visualizing which space in a real space has been captured as a keyframe and which space has not been captured.

Methods for notifying a user of a mapped area include a method of presenting an image of a virtual space where the positions and orientations of keyframes stored in a map and three-dimensional coordinates of extracted feature points have been rendered, as illustrated in FIG. 3 in "Parallel Tracking and Mapping for Small AR Workspaces", Proceedings of Sixth IEEE and ACM International. In this method, only an image of a virtual space is presented to the user, and thus the user himself or herself needs to consider and understand the correspondence relation between real and virtual spaces.

On the other hand, there is a method of showing an already-captured direction on an image of a real space that a user is seeing, using the MR technology, to facilitate the understanding of the association described above.

For example, Vuforia Object Scanner, whose information is available at: https://library.vuforia.com/articles/Training/Vuforia-Object-Scanner-Users-Guide/, uses a method that captures a real object placed in a real space from various directions to visualize a captured portion and an uncaptured portion on an apparatus that restores the shape of the real object. Specifically, a polygon mesh is constructed in such a manner as to surround the real object, and a part, which corresponds to the captured area, of the polygon mesh is filled with a color different from the other parts of the polygon mesh. Accordingly, a user is notified of the captured area.

Further, Japanese Patent Application Laid-Open No. 2008-65807 discusses an apparatus that visualizes a captured direction and distance of an indicator placed in a real space. As one of specific examples thereof, a method is proposed which colors an object of a hemispherical shape in such a manner as to surround the indicator.

SUMMARY OF THE INVENTION

In Japanese Patent Application Laid-Open No. 2008-65807 and Vuforia Object Scanner, which are described above, visualization of an imaging area with a specific real object as a center is realized. However, it is supposed that an MR system user not only observes the specific real object but also looks around the user himself or herself and observes a virtual object placed in a space including no real object from various directions. Hence, a method of visualizing a mapped space that the user desires to observe is required.

The present invention is directed to an information processing apparatus capable of visualizing a space that allows a highly accurate estimation of the position or orientation of a camera for a user.

According to an aspect of the present invention, an information processing apparatus includes an acquisition unit configured to acquire an image from an image capturing apparatus that captures an image of a real space, an estimation unit configured to estimate a position or orientation of the image capturing apparatus in the real space, based on the image, a creation unit configured to create a map including at least one keyframe, a setting unit configured to set an observation space of a user, a generation unit configured to analyze a relationship between the observation space set by the setting unit and the map created by the creation unit, and generate a model representing the keyframe included in the map, and a control unit configured to cause a display unit to display a combined image of an image based on the generated model and the image.

Further features of the present invention will become apparent from the following description of embodiments with reference to the attached drawings.

DESCRIPTION OF THE EMBODIMENTS

Figure 1:
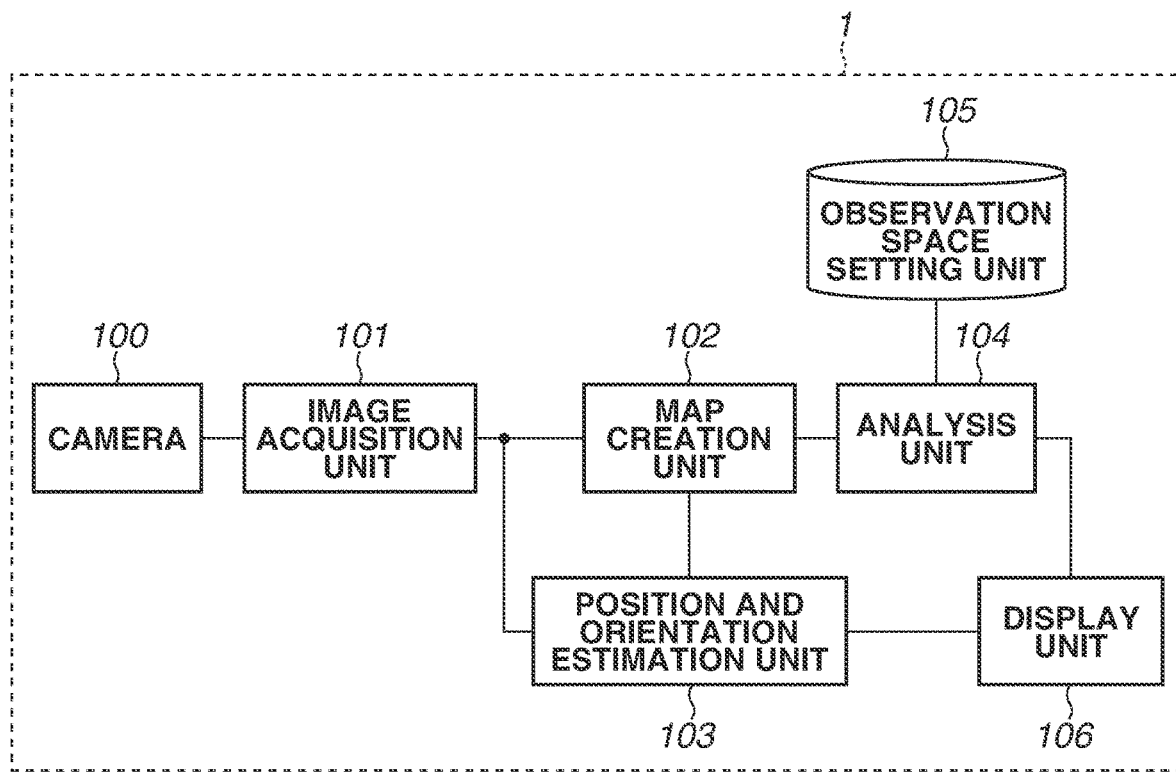
FIG. 1 is a block diagram illustrating a configuration of an information processing apparatus according to a first embodiment.

Embodiments are described in detail hereinafter with reference to the accompanying drawings. FIG. 1 is a block diagram illustrating a functional configuration of an information processing apparatus according to a first embodiment. An information processing apparatus 1 is a mixed reality (MR) system including a camera 100, an image acquisition unit 101, a map creation unit 102, a position-and-orientation estimation unit 103, an analysis unit 104, an observation space setting unit 105, and a display unit 106. In the present embodiment, a description is given assuming a configuration including one camera 100 and one display unit 106. However, the configuration may be a stereo configuration where a pair of the cameras 100 and the display units 106 is provided each for a left eye and a right eye. In the present embodiment, the information processing apparatus 1 is described as a head-mounted apparatus where the camera 100 and the display unit 106 are placed near the eye of the user. However, the physical placement of each unit is not limited thereto. The information processing apparatus 1 may be a hand-held apparatus such as a tablet computer and smartphone.

In the present embodiment, a description is given assuming an information processing apparatus that uses only an image to estimate the position-and-orientation of the camera 100 and create a map. However, in the embodiments of the present invention, information obtained from, for example, an acceleration sensor, an angular velocity sensor, an ultrasonic sensor, a magnetic sensor, a depth image sensor, or a laser range sensor may be used to estimate the position-and-orientation and to create a map.

Figure 2:
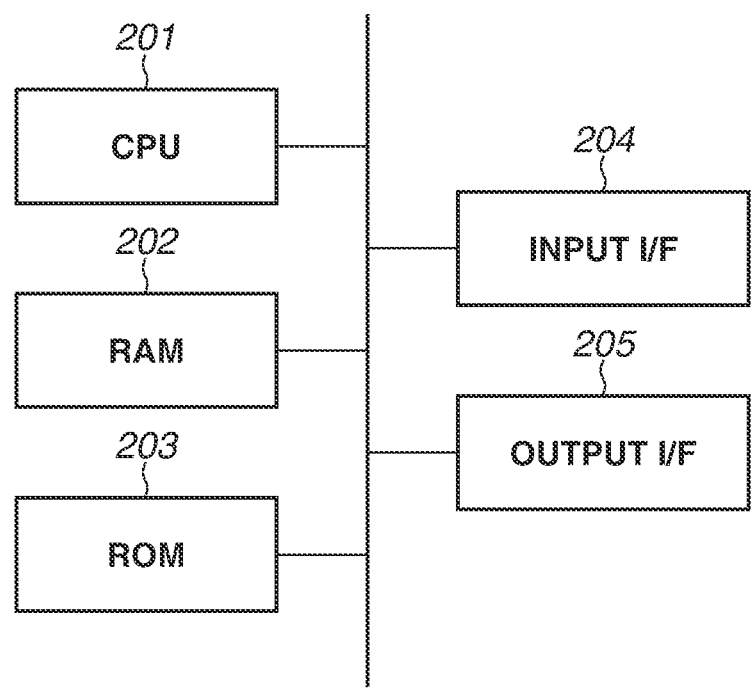
FIG. 2 is a block diagram illustrating a hardware configuration of the information processing apparatus.

The hardware configuration of the information processing apparatus 1 is described with reference to FIG. 2. In FIG. 2, a central processing unit (CPU) 201 controls the entire apparatus. A random access memory (RAM) 202 is used as a work area when the CPU 201 performs processing while controlling each unit. A read only memory (ROM) 203 stores, for example, a control program, various application programs, and data. The CPU 201 reads the control program stored in the ROM 203 into the RAM 202 and executes the control program, and then implements the units illustrated in FIG. 1 such as the image acquisition unit 101, the map creation unit 102, the position-and-orientation estimation unit 103, the analysis unit 104, and the observation space setting unit 105. An input interface (I/F) 204 receives information in a form that can be processed by the information processing apparatus 1, as an input signal, from the camera 100. An output I/F 205 outputs information in a form that can be processed by an external apparatus, as an output signal, to the external apparatus. For example, if the external apparatus is a display apparatus, the output I/F 205 outputs, to the display apparatus, an MR image output from the display unit 106. As described above, the function of each unit of the information processing apparatus 1 illustrated in FIG. 1 can be implemented by the CPU 201 executing a program. However, at least part of the units of the information processing apparatus 1 illustrated in FIG. 1 may operate as dedicated hardware. In this case, the dedicated hardware operates under control of the CPU 201.

The information processing apparatus 1 is described. The image acquisition unit 101 illustrated in FIG. 1 acquires an image of a real space captured by the camera 100. The position-and-orientation estimation unit 103 estimates the position-and-orientation of the camera 100 based on the image acquired by the image acquisition unit 101 and the map created by the map creation unit 102. An example of a specific procedure of the estimation is described. Firstly, one or more keyframes included in the map created by the map creation unit 102 are acquired. A keyframe includes at least an image obtained by capturing an image of a real space, the position-and-orientation of a camera that has captured the image, and information related to a feature extracted from the image. In the present embodiment, a description is given assuming that a feature point in the image, and information on two-dimensional coordinates and three-dimensional coordinates of the feature point are included in the information related to the feature extracted from the image. The image of the keyframe may have been captured by the camera 100 in the past or may have been captured in advance by another camera.

Next, the feature points in the image acquired by the image acquisition unit 101 and the image of the keyframe are associated. Examples of a method for associating feature points of the images include a method of detecting a corner point from an image and calculates the similarity of a local image near the corner point. However, the method for associating feature points in the embodiments is not limited to the above method.

When the correspondence between feature points in the images is obtained, a correspondence between three-dimensional coordinates of the feature point included in the keyframe and two-dimensional coordinates of the feature point in the image acquired by the image acquisition unit 101 is obtained. This correspondence is used to solve simultaneous equations called the Perspective-n-Point (PnP) problem, and thus the position-and-orientation of the camera is determined to be six degrees of freedom. Intrinsic camera parameters required to solve the PnP problem are assumed to be obtained in advance.

If a keyframe cannot be obtained from the map creation unit 102, the position-and-orientation of the camera 100 at that point may be set as the initial position-and-orientation, or the position-and-orientation may be estimated by use of an indicator such as a marker placed in the real space.

The above procedure allows estimating the position-and-orientation of the camera 100 processed in the position-and-orientation estimation unit 103. However, the process of the position-and-orientation estimation unit 103 according to the embodiments of the present invention is not limited to this.

The map creation unit 102 creates a map based on the image obtained by the image acquisition unit 101 and the position-and-orientation of the camera 100 obtained by the position-and-orientation estimation unit 103. The map includes one or more keyframes and a collection of feature points extracted from the keyframes.

A specific procedure for creating a map is described. Firstly, it is determined whether the image obtained by the image acquisition unit 101 is suitable for a keyframe. Examples of the determination condition include a condition that the position-and-orientation have been obtained correctly by the position-and-orientation estimation unit 103, and a region in the imaging area of the image, the region overlapping the imaging area of the image of the keyframe in the map, is less than or equal to a fixed size. However, the determination condition is not limited to above example.

If it is determined that the image obtained by the image acquisition unit 101 is suitable for a keyframe, a feature point is extracted. The extracted feature point is associated with a feature point extracted from a past keyframe. Consequently, the positions and orientations at a plurality of points of view can be obtained for one feature point. Hence, three-dimensional coordinates of the feature point can be obtained using the principle of triangulation. The three-dimensional coordinates of the feature point are stored as a part of the keyframe.

Figure 3:
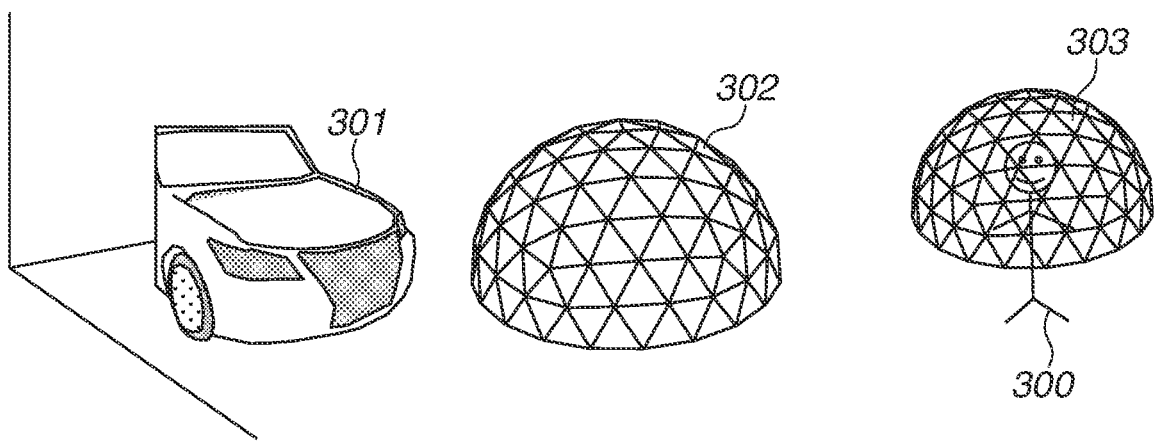
FIG. 3 is a schematic diagram illustrating examples of a space to be observed held by an observation space setting unit.

The observation space setting unit 105 holds the preset setting of a space that a user desires to observe for the information processing apparatus 1, as the user's setting of the observation space. Specific examples of the space desired to observe are described with reference to FIG. 3. For example, if a user 300 desires to place and observe a certain virtual object 301 in a certain place in a real space, a space occupied by the virtual object 301 in the real space is the space that the user 300 desires to observe. Furthermore, a polygon mesh 401 having an approximate shape of the virtual object 301 is also conceivable as the space desired to observe. For example, an ellipsoid or cuboid that contains the virtual object 301 may be set as the space desired to observe. If the shape of the virtual object 301 is not accurately determined, a simple geometric shape 302 created based on a rough position and size of the virtual object 301 may be set as the space desired to observe. Moreover, if the user 300 does not desire to observe a specific virtual object but desires to look around in the surrounding space, a space 303 that surrounds the user 300 may be set as the observation space. The desired space to observe is defined by the user depending on the purpose, and is not limited to these examples in the embodiments.

The analysis unit 104 analyzes the relationship between the setting of the space desired to observe held by the observation space setting unit 105 and the map created by the map creation unit 102, and creates a computer graphics (CG) model for visualizing a mapped space with respect to the space that the user 300 observes. The mapped space indicates a space captured in at least one keyframe within the space desired to observe held in the observation space setting unit 105.

Figure 4A:
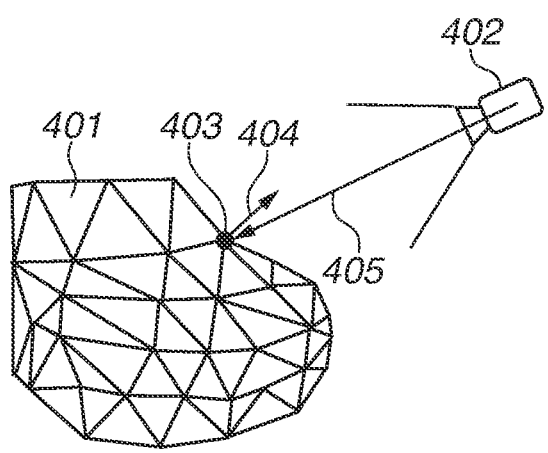
FIGS. 4A and 4B are schematic diagrams illustrating a target to be processed by an analysis unit.
Figure 4B:
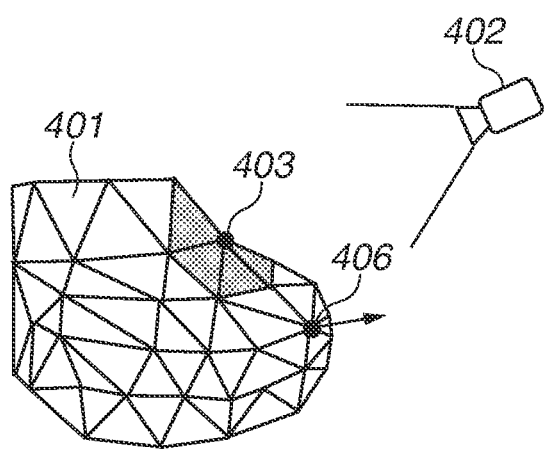

A specific procedure of the analysis unit 104 is described with reference to FIGS. 4A and 4B. The space desired to observe held by the observation space setting unit 105 is assumed to be the virtual object 301.

Firstly, the polygon mesh 401 having the approximate shape of the space desired to observe is generated. The color of all the vertices of the polygon mesh 401 is set to a setting color 1.

Next, it is determined whether each vertex of the polygon mesh 401 has been mapped. This can be achieved by performing the vertex visualization determination on all keyframes in the map created by the map creation unit 102. The vertex visualization determination is made through the following procedure: let a camera that has acquired a certain keyframe K be a camera 402 illustrated in FIGS. 4A and 4B, let the vertex of the polygon mesh 401 be the vertex V, and let a line segment from the optical center of the camera 402 to the vertex V (e.g., a vertex 403 illustrated in FIGS. 4A and 4B) be the line of sight E. If the line of sight E (e.g., an arrow 405 illustrated in FIG. 4A) does not cross the polygon mesh 401 or other virtual objects, and if an angle formed by the line of sight E and a normal N (e.g., an arrow 404 illustrated in FIG. 4A) to the vertex V is less than or equal to a fixed angle, the vertex V has been visualized by the camera 402 of the keyframe K. Accordingly, it can be determined that the vertex V has been mapped.

If the vertex V has been mapped, the vertex color of the vertex V is set to a setting color 2. Consequently, as illustrated in FIG. 4B, a polygon including the vertex V is rendered in the setting color 2, and thus the user 300 can recognize that the portion is included in the image of the keyframe K. Further, there is a condition that the angle formed by the line of sight E and the normal N is less than or equal to the fixed angle. Thus, for example, a vertex (e.g., a vertex 406 illustrated in FIG. 4B) having a normal different in orientation from the line of sight E is not determined to be visible on the camera 402. This characteristic allows the user 300 to confirm that the space occupied by the polygon rendered in the setting color 2 has been mapped from a direction of the front of the space.

The setting colors 1 and 2 are assumed to be preset. In the present embodiment, a description is given using the processing for a polygon mesh and vertices thereof. However, a model representing surfaces or volumes and the method of coloring a specific area of the model are not limited to those of a polygon mesh.

The display unit 106 generates a virtual image obtained by rendering the polygon mesh 401, based on the position-and-orientation of the camera 100 estimated by the position-and-orientation estimation unit 103 and an intrinsic parameter of the camera 100. At this time, the setting of the space desired to observe held by the observation space setting unit 105 and information on the vertex color set by the analysis unit 104 are reflected to perform rendering. In rendering, information other than the vertex color, such as a light source and texture, may also be considered. The generated virtual image is combined with the real space image acquired by the image acquisition unit 101 to generate and output a mixed reality (MR) image. Information other than the above information may be added to and rendered in the generated MR image. The user 300 observes "the CG model for visualizing the mapped space", which is displayed on the display unit 106, and accordingly can judge which space needs a keyframe.

Figure 5:
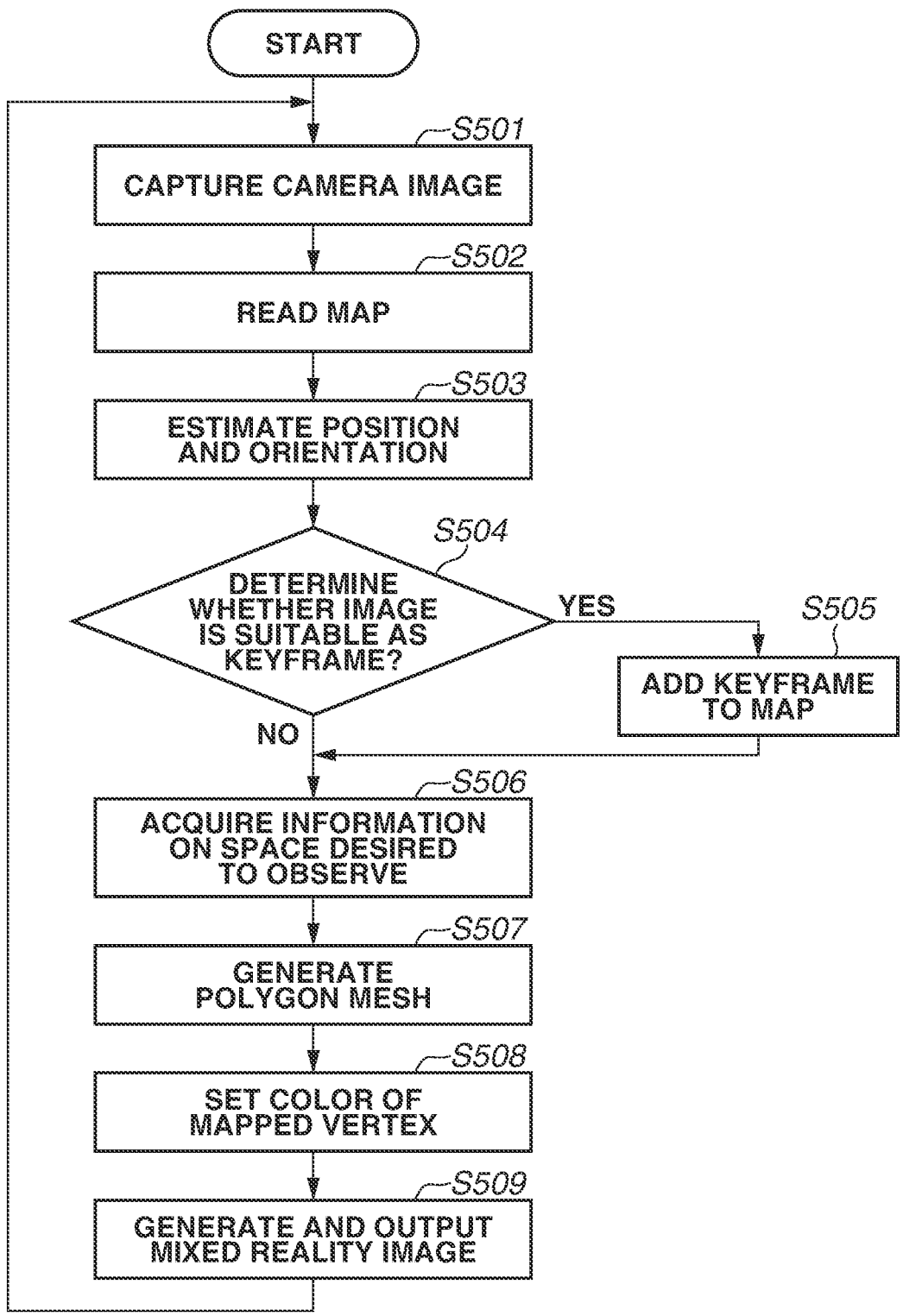
FIG. 5 is a flowchart illustrating processing performed by the information processing apparatus.

FIG. 5 is a flowchart illustrating processing performed by the information processing apparatus 1 to generate and output an MR image. In step S501, the image acquisition unit 101 acquires an image of a real space captured by the camera 100 through the input I/F 204. In step S502, the position-and-orientation estimation unit 103 reads the map created by the map creation unit 102. In step S503, the position-and-orientation estimation unit 103 estimates the position-and-orientation of the camera 100 in the real space based on the information on the map read in step S502 and the image of the real space captured in step S501. In step S504, the map creation unit 102 determines whether the image captured in step S501 is suitable for a keyframe. Examples of suitable condition as a keyframe include a case where the following two conditions are satisfied. However, the condition is not limited thereto in the embodiments. Condition 1 is that the estimation of the position-and-orientation of the camera 100 in step S503 has been successful. Condition 2 is that a region that overlaps a keyframe held in a map within an imaging area is less than or equal to a fixed size. In step S505, the map creation unit 102 adds the image as a keyframe to the map, if it is determined in step S504 that the image captured in step S501 is suitable for a keyframe (YES in step S504). At this time, a feature point is extracted from the image, and three-dimensional coordinates of the feature point are estimated. The estimation can be made by using association with a feature point extracted from an image of a keyframe in the map and triangulation.

If it is determined that the image captured in step S501 is not suitable for a keyframe (NO in step S504), processing proceeds to step S506. In step S506, the analysis unit 104 acquires information on the space desired to observe from the observation space setting unit 105. In step S507, the analysis unit 104 generates the polygon mesh 401 based on the information on the space desired to observe acquired in step S506. The vertex color of all the vertices of the polygon mesh 401 is set to the preset setting color 1. In step S508, the analysis unit 104 determines whether each vertex of the polygon mesh 401 generated in step S507 has been mapped. The vertex color of the mapped vertex is set to the preset setting color 2. The determination on whether the vertex has been mapped is based on the vertex visualization determination for a keyframe. In step S509, display unit 106 renders the polygon mesh 401 processed in step S508 as a virtual image, and combines the polygon mesh 401 with the real space image captured in step S501. An MR image generated in this manner is then output. When the polygon mesh 401 is rendered as a virtual image, the previously estimated intrinsic parameters of the camera 100 and the position-and-orientation of the camera 100 obtained in step S503 are used.

(First Modification)

In the first embodiment, in terms of the processing of step S508 performed by the analysis unit 104, the method for setting the vertex color of the mapped vertex of the polygon mesh 401 to the preset setting color 2 is described. However, the setting of the vertex color of a vertex in the embodiments is not limited to the above method, and is simply required to be a form where information on a keyframe included in a map is reflected.

For example, in the processing performed in step S508 by the analysis unit 104, the vertex visualization determination may be performed on all the keyframes in the map, and vertex colors may be set in accordance with the number of keyframes determined to be visible. Further, the vertex color may be set in accordance with the distance between the keyframe determined to be visible and the vertex.

(Second Modification)

In the first modification, in terms of the processing performed in step S508 by the analysis unit 104, the method for setting the vertex color of the mapped vertex is described. However, the shape of the polygon mesh 401 may be changed to allow distinguishing the mapped vertex from the other vertices.

For example, the analysis unit 104 may produce a projection or depression on the polygon mesh 401 by moving the coordinates of the mapped vertex in the direction of a normal. The analysis unit 104 may add a straight line representing the line of sight E to the mapped vertex to illustrate the direction, on the display unit 106, in which the vertex has been captured in the keyframe. The length of the straight line representing the line of sight E may be fixed or changed depending on the length of the line of sight E.

It has been described assuming that the analysis unit 104 in the first embodiment creates a CG model for visualizing a space captured in at least one keyframe within the space desired to observe set by the observation space setting unit 105, as a mapped space. However, even if the space desired to observe has been captured in a keyframe, an appearance of the space on an image may vary greatly depending on the position from which the space has been captured. For example, the space desired to observe may look smaller on the image with the increasing distance from the image-capturing position (i.e., the position of the optical center of the camera), and detailed features may be lost. If the image-capturing position is different, the angle to view the space changes, and the space may look largely different on the image. Hence, in the present embodiment, the mapped space is visualized, while the camera position of an image of a keyframe is also considered.

Figure 6:
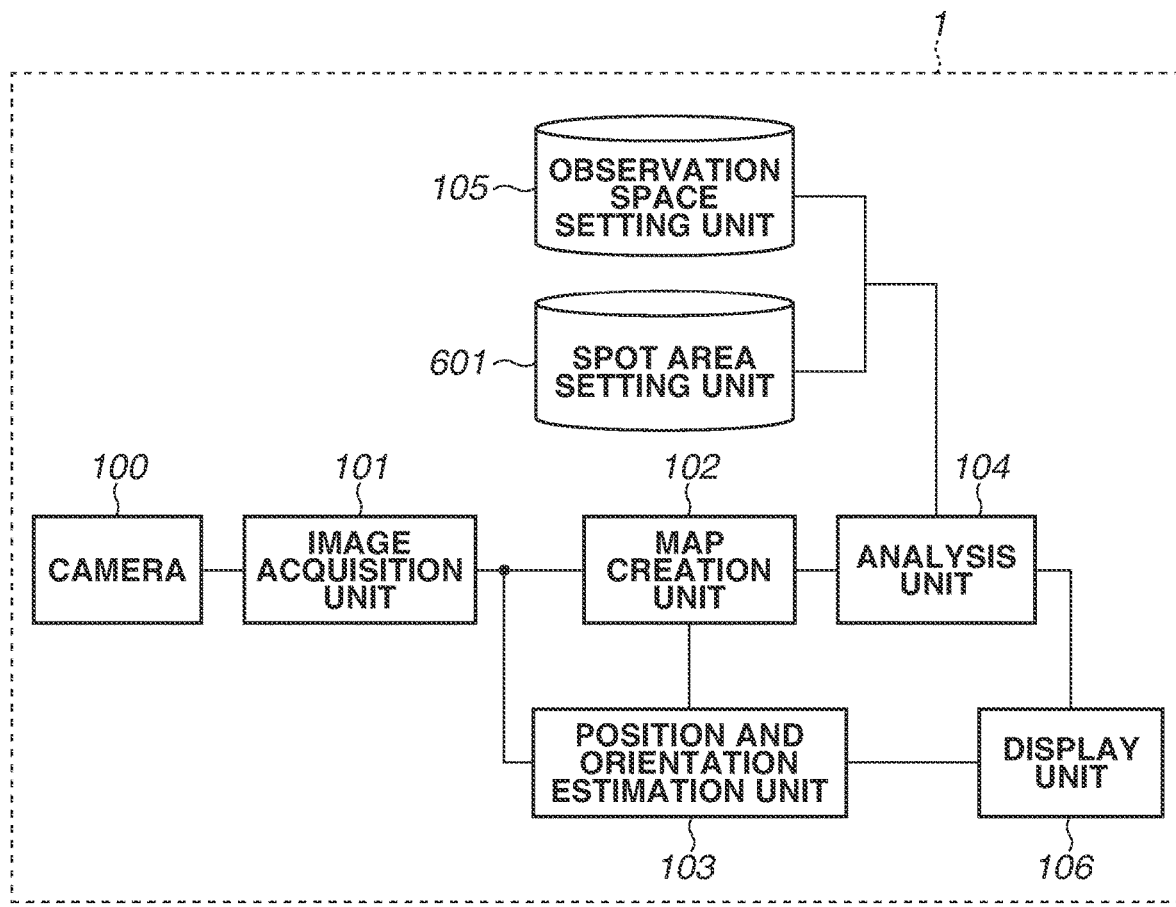
FIG. 6 is a block diagram illustrating a configuration of an information processing apparatus according to a second embodiment.

FIG. 6 is a block diagram illustrating the functional configuration of an information processing apparatus according to a second embodiment. In the configuration, a spot area setting unit 601 is added to the information processing apparatus 1 described in the first embodiment.

Figure 7B:
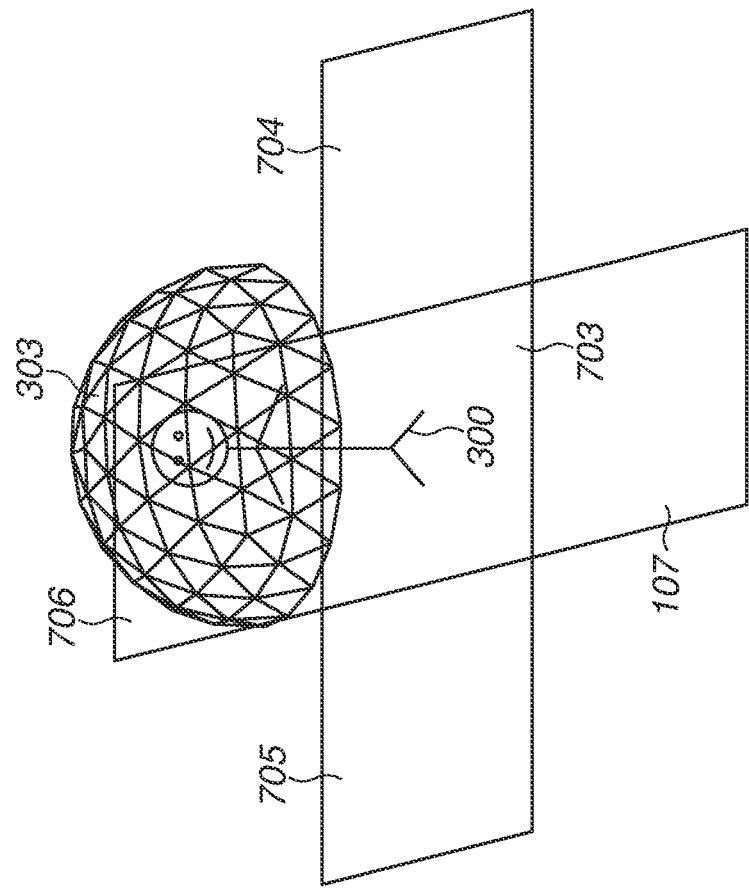
FIGS. 7A and 7B are diagrams illustrating examples of a spot area held by a spot area setting unit according to the second embodiment.
Figure 7A:
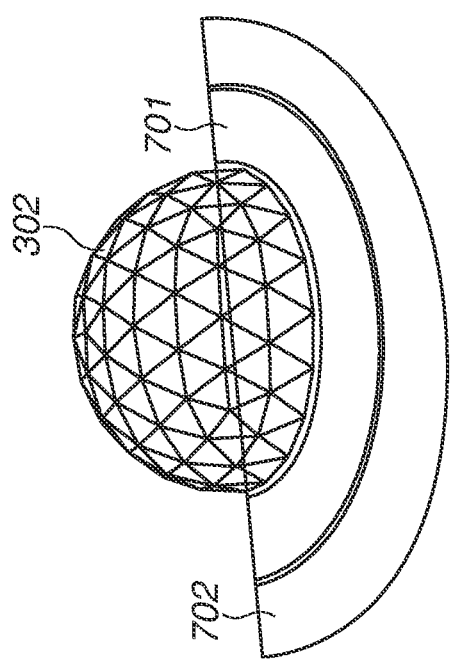

The spot area setting unit 601 sets one or more spot areas with respect to the space desired to observe set by the observation space setting unit 105. The spot area is an area where images are considered to look similar if a space desired to capture is captured from within the area. The spot area is set based on user input or a predetermined rule. Examples of the spot area are described with reference to FIGS. 7A and 7B. For example, if the space 302 (e.g., the hemispherical shape) is desired to observe, areas where distances to centers thereof are within a fixed range are set as spot areas 701 and 702. When images are captured from within the spot area toward the center of the space 302 desired to observe, the sizes of the space 302 desired to observe appearing in the images are equal as long as within the same spot area. If the space desired to observe is a space around the user 300 as in a space 303, how the surrounding space 303 looks may change greatly when the user 300 moves. Hence, an area is sectioned like a grid centering an initial position of the user 300 to set spot areas 703 to 706. The above description is an example. A spot area may be freely set in accordance with the space desired to observe set by the observation space setting unit 105.

Figure 8:
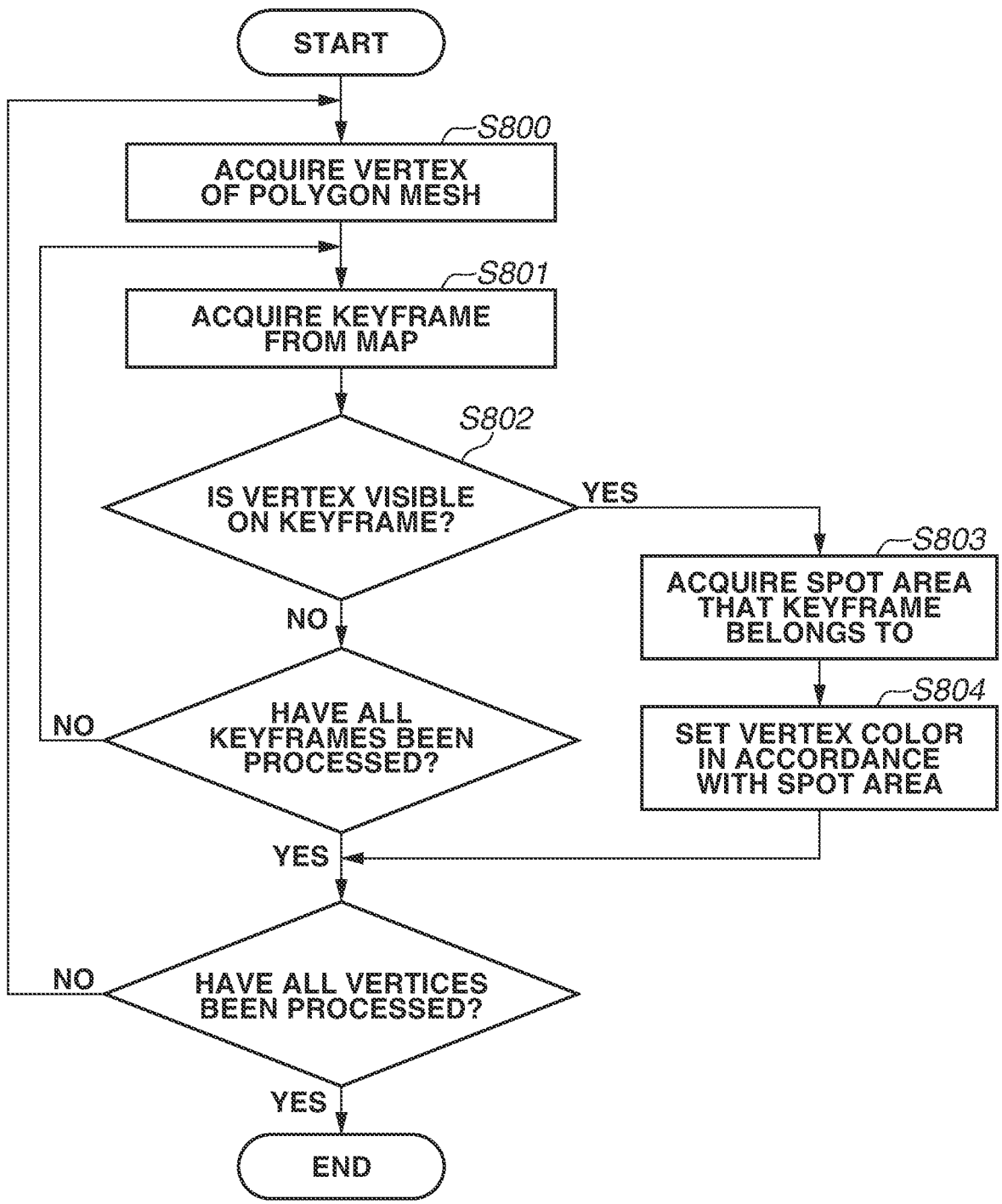
FIG. 8 is a flowchart illustrating processing performed by an analysis unit according to the second embodiment.

In the analysis unit 104 in the present embodiment, if a vertex of the polygon mesh 401 is visible on a keyframe in the processing performed in step S508 described in the first embodiment, a color for a spot area to which the keyframe belongs is set. In the present embodiment, the processing performed in step S508 performed by the analysis unit 104 in the first embodiment is changed. The changed processing is described using a flowchart illustrated in FIG. 8. Processes of steps S802 to S804 are performed for each pair of the vertex of the polygon mesh 401 generated in step S507 and a keyframe in the map created by the map creation unit 102.

In step S800, one vertex is acquired from the polygon mesh 401 to perform processing on a vertex-by-vertex basis. In step S801, one keyframe is acquired from the map to perform processing on a keyframe-by-keyframe basis. In step S802, it is determined whether the vertex of the polygon mesh 401 is visible on an image of the keyframe. The determination method is as same as the method described in the first embodiment. In step S803, if it is determined in step S802 that the vertex is visible (YES in step S802), the position of a camera that has captured the image of the keyframe is acquired. It is determined which spot area the position is included in (belongs to), and then an ID of the spot area is acquired. If the spot area is set on a plane in three-dimensional space (i.e., a floor surface), it is determined which spot area a point being a projection of the camera position on the plane belongs to. In step S804, a preset setting color is set as the vertex color in accordance with the ID of the spot area acquired in step S802. When the setting of the setting color is completed, the processing proceeds to setting for the next vertex.

(Third Modification)

In the second embodiment, each vertex of the polygon mesh 401 is set to a vertex color in accordance with a spot area to which a keyframe where the vertex has been determined to be visible belongs. However, the vertex may be visible on a plurality of keyframes depending on the vertex, and spot areas to which the keyframes belong may be different. Further, if the color of each vertex of one polygon mesh 401 is different, it may be difficult for the user 300 to identify a space where the position-and-orientation of the camera 100 can be estimated with high accuracy. Hence, the analysis unit 104 may determine to which spot area the position of the camera 100 belongs, and set only a keyframe belonging to the same spot area as the camera 100, as a process target, among the keyframes included in the map created by the map creation unit 102. Specifically, in step S801 in the second embodiment, only a keyframe belonging to the same spot area as the camera 100 may be acquired. Consequently, an MR image displayed on the display unit 106 is simplified, and it becomes easier for the user 300 to check a mapped space.

(Fourth Modification)

A specific method for setting a space desired to observe held by the observation space setting unit 105 described in the first and second embodiments may be an input method using the point of view of the user 300 (e.g., the position of the camera 100). Specifically, a shape that centers the position of the camera 100 at a certain time (i.e., at a time to start using the information processing apparatus 1) and surrounds around the camera 100 may be set in the observation space setting unit 105. In this case, as an example of a spot area set by the spot area setting unit 601, areas obtained by dividing a plane in a grid pattern may be set as illustrated in the spot areas 703 to 706 illustrated in FIG. 7B. In order that the user 300 may look around himself or herself in the surrounding space, the space desired to observe with the position of the point of view of the user 300 as the center can be set by the above method.

(Fifth Modification)

A specific method for setting the space desired to observe held by the observation space setting unit 105 in the first and second embodiments may be an input method using the line of sight of the user 300. As a specific example of the method for setting, a method in which the observation space setting unit 105 sets the observation space by accepting user input is described. Firstly, the analysis unit 104 finds a point at a fixed distance (e.g., approximately 1.5 m) from the position of the point of view of the user 300 (e.g., the position of the camera 100) in a direction of the line of sight of the user 300 (e.g., the optical axis of the camera 100). This point is set as a pointing point of the user 300. The pointing point is rendered on the display unit 106 to displays the rendered pointing point to the user 300. The user 300 confirms the entry of the pointing point at the appropriate time while operating the pointing point by moving the camera 100.

The analysis unit 104 generates a geometrical shape in accordance with the confirmed pointing points, and displays the geometric shape on the display unit 106. If there are, for example, two pointing points, a sphere with one of the two pointing points as the center and the distance between the two points as the radius may be generated. If there are four linearly independent pointing points, a cuboid formed by the four points may be generated. Furthermore, in order to reduce the number of pointing points that are necessary to define a geometric shape, the pointing points may not be arbitrary points in three-dimensional space but may be points in a space constrained by, for example, a plane, a grid, or an axis.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments, but is defined by the scope of the following claims.

This application claims the benefit of Japanese Patent Application No. 2018-182093, filed Sep. 27, 2018, which is hereby incorporated by reference herein in its entirety.

What is claimed is:

1. An information processing apparatus comprising:
one or more processors; and
one or more memories coupled to the one or more processors, the one or more memories having stored thereon instructions which, when executed by the one or more processors, cause the apparatus to:
acquire an image of a real space captured by an image capturing device;
estimate a position and orientation of the image capturing device when the acquired image was captured based on the acquired image and a map,
wherein the map includes keyframe information which contains a captured image determined as a keyframe, a position and orientation of the image capturing device when the captured image determined as the keyframe was captured, and information related to a feature extracted from the captured image determined as the keyframe;
create the map by determining the acquired image as the keyframe, if the acquired image satisfies a predetermined condition;
set an observation space to be observed by a user;
generate an image representing a mapped area for which the keyframe has been determined in the observation space; and
cause a display device to display a combined image of the image representing the mapped area and the acquired image.

2. The information processing apparatus according to claim 1, wherein the predetermined condition includes a condition that the position and orientation of the image capturing device when the acquired image was captured have been successfully estimated.

3. The information processing apparatus according to claim 1, wherein the predetermined condition includes a condition that an overlapping region between the acquired image and the image of the keyframe in the map is less than or equal to a predetermined size.

4. The information processing apparatus according to claim 1, wherein the a color or shape of the image representing the mapped area is determined based on the observation space and the keyframe information.

5. The information processing apparatus according to claim 1, the instructions, when executed by the one or more processors, further cause the apparatus to set at least one spot area for capturing an image of the observation space,
wherein the mapped area is determined by analyzing a relationship between the observation space, the map, and the spot area.

6. The information processing apparatus according to claim 1,
wherein the observation space is set, around a position of a point of view of the user, based on at least one of a preset position and size of the observation space, and
wherein the position of the point of view of the user is set based on the estimated position and orientation of the image capturing device.

7. The information processing apparatus according to claim 1,
wherein a position and a size of the observation space is set based on the estimated position and orientation of the image capturing device.

8. The information processing apparatus according to claim 1, wherein the observation space is set based on at least one of a shape, a position, and a size of a virtual object that is observed by the user.

9. The information processing apparatus according to claim 1, wherein the image representing the mapped area is a computer graphics model for visualizing the mapped area.

10. The information processing apparatus according to claim 1, wherein the observation space is set as a polygon mesh.

11. The information processing apparatus according to claim 10, wherein the image representing the mapped area is the polygon mesh having a vertex corresponding to the keyframe in a different color.

12. An information processing method comprising:
acquiring an image of a real space captured by an image capturing device;
estimating a position and orientation of the image capturing device when the acquired image was captured, on a basis of the acquired image and a map,
wherein the map includes keyframe information which contains a captured image determined as a keyframe, a position and orientation of the image capturing device when the captured image determined as the keyframe was captured, and information related to a feature extracted from the captured image determined as the keyframe;
creating the map by determining the acquired image as the keyframe, if the acquired image satisfies a predetermined condition;
setting an observation space to be observed by a user;
generating an image representing a mapped space area for which the keyframe has been set in the observation space; and
causing a display device to display a combined image of the image representing the mapped area and the acquired image.

13. The information processing method according to claim 12, wherein the a color or shape of the image representing the mapped area is determined based on the observation space and the keyframe information.

14. The information processing method according to claim 12, further comprising
setting at least one spot area for capturing an image of the observation space,
wherein the mapped area is determined by analyzing a relationship between the observation space, the map, and the spot area.

15. The information processing method according to claim 12,
wherein the observation space is set, around a position of a point of view of the user, based on at least one of a preset position and size of the observation space, and
wherein the position of the point of view of the user is set on a basis of the estimated position and orientation of the image capturing device.

16. The information processing method according to claim 12,
wherein a position and size of the observation space is set based on the estimated position and orientation of the image capturing device.

17. The information processing method according to claim 12, wherein the observation space is set in accordance with at least one of a shape, a position, and a size of a virtual object that is observed by the user.

18. The information processing method according to claim 12, wherein the image representing the mapped area is a computer graphics model for visualizing the mapped area.

19. The information processing method according to claim 12, wherein the observation space is set as a polygon mesh.

20. The information processing method according to claim 19, wherein the image representing the mapped area is the polygon mesh having a vertex corresponding to the keyframe in a different color.

21. A non-transitory storage medium storing a program causing a computer to execute a method, the method comprising:
   acquiring an image of a real space captured by an image capturing device;
   estimating a position and orientation of the image capturing device when the acquired image was captured, on a basis of the acquired image and a map,
   wherein the map includes keyframe information which contains a captured image determined as a keyframe, a position and orientation of the image capturing device when the captured image determined as the keyframe was captured, and information related to a feature extracted from the captured image determined as the keyframe;
   creating the map by determining the acquired image as the keyframe, if the acquired image satisfies a predetermined condition;
   setting an observation space to be observed by a user;
   generating an image representing a mapped space area for which the keyframe has been set in the observation space; and
   causing a display device to display a combined image of the image representing the mapped area and the acquired image.

22. The non-transitory storage medium according to claim 21, wherein the a color or shape of the image representing the mapped area is determined based on the observation space and keyframe information.

* * * * *